United States Patent [19]

Somlo

[11] 3,870,707
[45] Mar. 11, 1975

[54] PROCESS FOR THE MANUFACTURE OF N,N-DISUBSTITUTED CARBAMIC ACID HALIDES

[75] Inventor: Tibor Somlo, Birsfelden, Switzerland

[73] Assignee: Ciba-Geigy AG, Basel, Switzerland

[22] Filed: Feb. 14, 1972

[21] Appl. No.: 226,320

[30] Foreign Application Priority Data
Feb. 16, 1971 Switzerland.................... 2246/71

[52] U.S. Cl.... 260/239 E, 260/239 B, 260/247.2 R, 260/293.86, 260/326.4, 260/544 C, 424/244, 424/248, 424/267, 424/274, 424/315
[51] Int. Cl........................................... C07d 23/06
[58] Field of Search.... 260/544 C, 326.5 E, 293.88, 260/293.86, 247.7 H, 239 E, 239 AA, 239 B, 326.4, 247.2 R

[56] References Cited
UNITED STATES PATENTS
3,320,308   5/1967   Cotin ............................ 260/544 C OTHER PUBLICATIONS
Harry Tilles, J. Am. Chem. Society, Vol. 81, pages 714-727, (1959).

*Primary Examiner*—Donald G. Daus
*Assistant Examiner*—Jose Tovar
*Attorney, Agent, or Firm*—Joseph G. Kolodny; Edward McC. Roberts; Prabodh I. Almaula

[57] ABSTRACT

A process for the manufacture of N,N-disubstituted carbamic acid halides, preferably chlorides or bromides, of the general formula

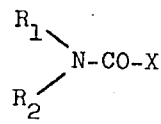

in which $R_1$ and $R_2$ each represent an alkyl radical and $R_1$ and $R_2$, together with the nitrogen atom are able to form a heterocyclic ring, which optionally contains further heteroatoms, and in which X is a halogen atom, especially bromine or chlorine, wherein a secondary amine of the formula

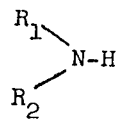

or the hydrochloride thereof, is reacted with a carbonyl halide in a high boiling solvent and the new N,N-disubstituted carbamic acid halides.

5 Claims, No Drawings

PROCESS FOR THE MANUFACTURE OF N,N-DISUBSTITUTED CARBAMIC ACID HALIDES

The present invention relates to N,N-disubstituted carbamic acid halides of the general formula

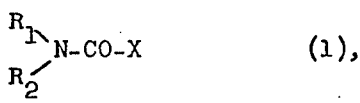 (1), wherein $R_1$ and $R_2$ each represent an alkyl radical and $R_1$ and $R_2$ together with the nitrogen atom are able to form a heterocyclic ring, which optionally contains further heteroatoms, for example oxygen, sulphur or nitrogen atoms, and wherein X is a halogen atom, preferably a chlorine or bromine atom.

The alkyl radicals $R_1$ and $R_2$ may contain a smaller or greater number of carbon atoms, and they may be straight-chain or branched. They may also contain aryl radicals, for example in the benzyl radical. Compounds of primary interest are those of the formula (1), in which $R_1$ and $R_2$ are alkyl radicals containing from 1 to 18 carbon atoms. Where $R_1$ and $R_2$ together with the nitrogen atom of the carbamic radical form a heterocyclic ring, preferred compounds are those of the formula

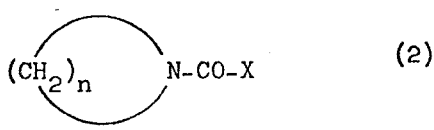 (2)

wherein $n$ is a positive integer from 2 to 6. Compounds of the kind characterised by the formula (2) are, for example, those in which an aziridine, pyrrolidine, piperidine or hexamethylene-imine radical is bonded to the carbamic acid halide radical. If the heterocyclic ring formed by $R_1$, $R_2$ and the nitrogen atom contains a further hetero atom in addition to the nitrogen atom, suitable compounds are primarily those of the formula

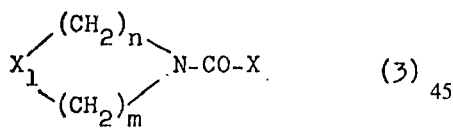 (3)

wherein $X_1$ is an oxygen or sulphur atom or an —NR- group, in which R is a hydrogen atom or an alkyl radical, X is a halogen atom, preferably a chlorine atom, and n and m represent positive integers which are preferably small and equal. Important compounds of this kind are those of the formula

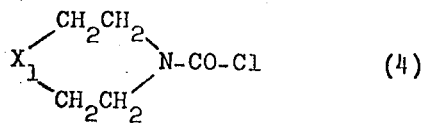 (4)

wherein $X_1$ has the meaning given in the elucidation of the formula (3). The respective morpholine compound may be cited as an example of a compound of the formula (4).

The present invention relates to a process for the manufacture of the N,N-disubstituted carbamic acid halides described hereinabove.

The N,N-disubstituted carbamic acid halides may be manufactured by various methods.

The method generally employed is the reaction of secondary amines with phosgene according to the equation

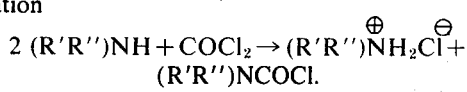

In this case, 1 mol of the amine hydrochloride is formed in addition to the desired carbamic chloride. The reaction is carried out in apolar solvents, for example benzene, at low temperatures (below 10°C). The amine hydrochloride is then filtered with exclusion of atmospheric moisture and the carbamic chloride isolated from the solvent by fractionated distillation. The disadvantages of this method are that two mols of amine are required for one mol of carbamic chloride, that it is technically difficult to control the pronounced heat effect of the reaction, that the process has to be carried out at high dilutions on account of the voluminous mass of salt crystals that form, and that finally, the processing of the reactants is complicated.

Further known methods possess similar disadvantages. Thus, for example, carrying out the reaction described hereinabove with 1 mol of amine and 1 mol of pyridine instead of 2 mols of amine is expensive and complicated. And the known reaction of trimethyl amine with phosgene, which leads to the corresponding dimethylcarbamic chloride and methyl chloride, is too special; moreover, there are limits to its applicability as regards costs, since other trialkylamines, for example, triethylamine, are too expensive.

Since the manufacture of N,N-disubstituted carbamic chlorides according to the methods which are known in the art is expensive, or is complicated or linked with technical difficulties, there thus arose the need to find a method of manufacture which does not possess the disadvantages of the known methods.

The discovery has now been made that it is possible to manufacture in good yield (90–100% of theory) and high purity (over 95%) N,N-disubstituted carbamic chloride of the general formula (1), if a secondary amine of the formula

 (5)

or the hydrochloride thereof, is reacted with phosgene in high boiling solvents, or preferably in the carbamic chloride to be manufactured itself as solvent, at elevated temperatures (at about 60–160°C), preferably at 80–95°C. The amine and the phosgene are advantageously both added together simultaneously and continuously. The phosgene should be present in an excess of 5 to 10% conditioned by factors which relate to the technical apparatus used.

The reaction proceeds according to the empirical equation $(R_1R_2)NH + COCl_2 \rightarrow (R_1R_2)NCOCL + HCl$ or

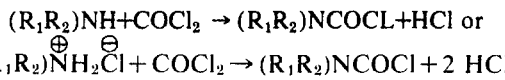

so that, instead of an alkyl chloride as in the reaction mentioned hereinabove, hydrogen chloride is formed and for every mol of amine, 1 mol of the desired final product is obtained. The process may be carried out in individual batches or, preferably, continuously. In carrying out the reaction continuously, the reactants are processed in a reaction vessel equipped with a stirrer and in which there is a solvent, preferably the desired carbamic chloride derived from a previous batch. On running in the amine and passing in phosgene the reaction proceeds of its own accord at corresponding temperature. The resulting carbamic chloride may be drawn off from time to time in individual amounts or discharged into a second vessel, from which the hydrogen chloride which has formed and excess phosgene are removed by passing in dry air.

The resulting product is sufficiently pure to enable it to be used for most purposes without further processing.

As starting materials it is possible to use industrial phosgene and a secondary amine, likewise of industrial purity. As suitable amines there may be mentioned: dimethylamine, diethylamine, dibutylamine, diisobutylamine, methylethylamine, diisoamylamine, diisoheptylamine, pyrrolidine, piperidine, morpholine, dibenzylamine, methylcyclohexylamine, hexamethylene-amine, N-methylpiperazine etc.

Instead of phosgene it is possible to use other carbonyl halides.

N,N-disubstituted carbamic chlorides are important commercial intermediate products for the manufacture of various products. Thus, for example, by reaction with alcohols, secondary amines or aromatic compounds (according to the Friedel-Crafts reaction), it is possible to obtain from them the corresponding carbamates and substitutedureas which are useful as solvents and catalysts and arylcarboxylic amides. Of special interest is their use as starting materials in the production of carbamates, which are valuable insecticides. Substantial commercial importance therefore attaches to the improved method of manufacturing N,N-disubstituted carbamic chlorides according to the present invention.

The following Examples illustrate the invention, the parts and percentages being by weight unless otherwise stated.

EXAMPLE 1
Dimethylcarbamic chloride

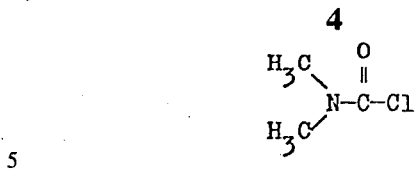

400 Parts of dimethylcarbamic chloride manufactured from a previous batch are charged into a 1 ½ litre flask which is connected to a hydrogen chloride absorption installation and then, while stirring at 60–65°C, 30 parts of phosgene are passed in beneath the surface. Then 45 parts of dimethylamine gas and 110–119 parts of phosgene per hour are passed in beneath the surface simultaneously and uniformly. During the first half hour that the dimethylamine and phosgene are passed in, the temperature is raised to 85°C by gentle warming and then kept at 85–90°C by gentle cooling.

The dimethylcarbamic chloride which is formed can be drawn off continuously, or it is processed batchwise after passing in 450 parts of dimethylamine and 1100 parts of phosgene. The processing takes place by blowing out the hydrogen chloride gas and excess phosgene with dry compressed air at 60–65°C. In the continuous variant of the process, the blowing out is carried out in a column filled with packing by application of the counter current principle. Yield: 90–95% of theory. The resulting crude dimethylcarbamic chloride is 98–99% and can be used for most purposes; but it can also be distilled in vacuo. Boiling point: 59°C. Micromelting point: −34°C to −35.4°C. $n_D^{20}$ : 1.4535–1.4560.

If in Example 1 the 45 parts of dimethylamine are replaced by 73 parts of diethylamine,
129 parts of dibutylamine,
129 parts of diisobutylamine,
157 parts of diisoamylamine,
213 parts of diisoheptylamine,
71 parts of pyrrolidine,
85 parts of piperidine,
87 parts of morpholine or
197 parts of dibenzylamine, then the following carbamic chlorides are obtained:

| Example | Starting amine | carbamic chloride | boiling point |
|---|---|---|---|
| Example 2 | $(H_5C_2)_2NH$ | $(CH_3CH_2)_2N-CO-Cl$ | b.p.$_8$: 60–62° |
| Example 3 | $(CH_3CH_2CH_2CH_2)_2NH$ | $(CH_3CH_2CH_2CH_2)_2N-CO-Cl$ | b.p.$_4$: 100–101° |
| Example 4 | $((CH_3)_2CH-CH_2)_2NH$ | $((CH_3)_2CH-CH_2)_2N-CO-Cl$ | b.p.$_{15}$: 115° |
| Example 5 | $(C_5H_{11})_2NH$ (Diisoamylamin) | $(C_5H_{11})_2N-CO-Cl$ | b.p.$_{15}$: 136–140° |

| Example | Starting amine | carbamic chloride | boiling point |
|---|---|---|---|
| Example 6 | $(C_7H_{15})_2NH$ (diisoheptylamine) | $(C_7H_{15})_2N-CO-Cl$ | $b.p._2$: 140–142° |
| Example 7 | ⬡NH | ⬡N-CO-Cl | $b.p._{20}$: 124–25° |
| Example 8 | ⬣NH | ⬣N-CO-Cl | $b.p._{13}$: 112° |
| Example 9 | O⬣NH | O⬣N-CO-Cl | $b.p._8$: 103° |
| Example 10 | ⬡-CH$_2$\NH / ⬡-CH$_2$ | ⬡-CH$_2$\N-CO-Cl / ⬡-CH$_2$ | $b.p._{0,1}$: 150–152° |

EXAMPLE 11

Morpholinocarbamic chloride

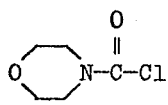

400 Parts of morpholinocarbamic chloride are charged into a 1 ½ litre flask and at −5 to +5°C 550 parts of phosgene are passed in. Then at 0 to −5°C (with strong cooling) 870 parts of morpholine are added dropwise. The suspension of crystals is subsequently heated to 90°C and a further 550 parts of phosgene are passed in at 90–95°C. The reaction mixture is then exhausted with dry compressed air at 60–65°C until it is practically free of phosgene. In this manner there are obtained altogether 1760 parts of crude morpholinocarbamic chloride (corresponding to a yield of 91% after exhaustion of the initial reaction mixture). The product contains as single impurity a few percent of dimorpholinocarbamide chloride, which has no deleterious effects in most applications. The crude product can be distilled in a high vacuum; $b.p._{0.05}$ = 50°C; about 1500 parts of pure morpholinocarbamic chloride are obtained by distillation. $n_D^{20}$ = 1.4981.

EXAMPLE 12

Pyrrolidine-carbamic chloride

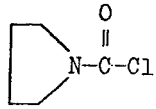

800 Parts of chlorobenzene are charged into a 1 ½ litre flask and 430 parts of pyrrolidine hydrochloride are suspended therein. The suspension of crystals is heated to 90°C and 480 parts of phosgene are passed in at 90–95°C within about 4 hours. Towards the end of the introduction of the phosgene the pyrrolidine hydrochloride passes into solution, a clear, light yellow solution being formed. Upon completion of the introduction of phosgene, the reaction is stirred for half an hour at 90–95°C and subsequently exhausted at 60–65°C with dry compressed air until it is practically free of phosgene. Then the chlorobenzene is distilled off at about 100 mm Hg, to leave as residue 500 g of commercially pure pyrrolidinecarbamic chloride (corresponding to a yield of 94% of theory). The product can be distilled in vacuo at $b.p._8$ = 93–95°C.

The pyrrolidine hydrochloride can be manufactured from pyrrolidine and hydrogen chloride gas direct in a starting flask into which chlorobenzene has been initially charged. If pyrrolidine-carbamic chloride is used as solvent instead of chlorobenzene, the separation of the chlorobenzene by distillation at the conclusion of the reaction is omitted. However, the reaction conditions and yield remain unchanged.

EXAMPLE 13

Diisopropylcarbamic chloride

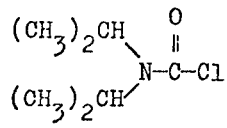

400 Parts of chlorobenzene are charged into a 1 ½ litre flask which is connected to a hydrogen chloride absorption installation and then, while stirring, 20 parts of phosgene are passed in at 120°C. Then 101 parts of diisopropylamine and 55–60 parts of phosgene per hour are passed in simultaneously and uniformly. During the entire reaction the temperature is kept at 120–125°C by gentle warming. After 4 hours, when altogether 404 parts of diisopropylamine and about 240 parts of phosgene have been passed in and a thick suspension of crystals has formed in the reaction flask, the flow of diisopropylamine is stopped and a further 240 parts of phosgene are introduced within 20 hours at constant temperature. The flow of phosgene must be so regulated that only hydrogen chloride gas — but no phosgene — escapes from the reaction flask. The reaction is complete when all the crystals have passed into solution and a clear, light yellow solution has formed. Thereupon the reaction mixture is cooled to 65°C and exhausted at 60–65° with dry compressed air until it is free of phosgene. On further cooling, the diisopropylcarbamic chloride crystallises from the chlorobenzene in large rhombic crystals. It can be filtered and dried, when analytically pure diisopropylcarbamic chloride having a melting point of 56°C is obtained. Another method of processing consists in distilling off the chlorobenzene and then distilling the product in vacuo (b.p.$_8$ = 80°C). In this process 620 g of analytically pure diisopropylcarbamic chloride having a melting point of 56°C are obtained (corresponding to 95°C of theory).

I claim:

1. A process for the manufacture of N,N-disubstituted carbamic acid chlorides of the formula

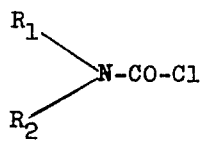

in which $R_1$ and $R_2$ each represent alkyl of 1 to 18 carbon atoms or benzyl, or $R_1$ and $R_2$ taken together with the nitrogen atom represent aziridino, pyrrolidino, piperidino, hexamethyleneimino or morpholino, consisting of the step of treating a secondary amine of the formula $R_1R_2NH$ with phosgene, at a temperature in the range of 60 to 160°C, wherein the solvent is the N,N-disubstituted carbamic acid chloride being manufactured.

2. The process of claim 1, wherein $R_1$ and $R_2$ taken together with the nitrogen atom represent aziridino, pyrrolidino, piperidino, hexamethyleneimino or morpholino.

3. The process of claim 1, wherein $R_1$ and $R_2$ are benzyl or alkyl of 1 to 18 carbon atoms.

4. The process of claim 3, wherein $R_1$ and $R_2$ are alkyl of 1 to 7 carbon atoms.

5. The process of claim 3, wherein $R_1$ and $R_2$ are benzyl.

* * * * *